June 10, 1969 A. KLEINLE 3,449,174
COAXIAL JACKETTED THERMOCOUPLE
Filed March 24, 1966
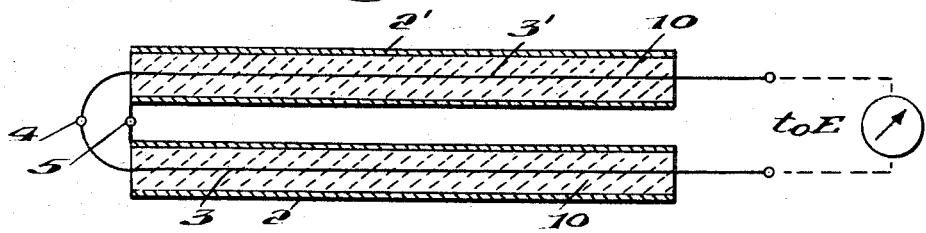
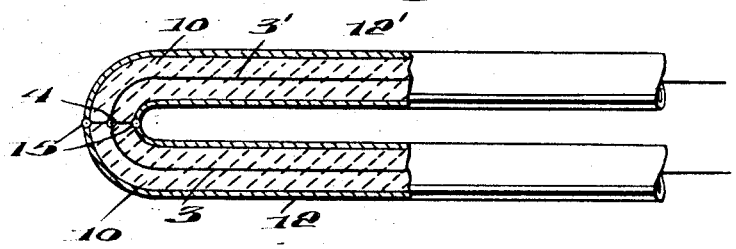
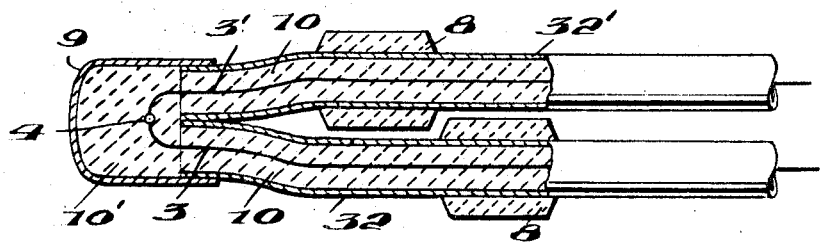
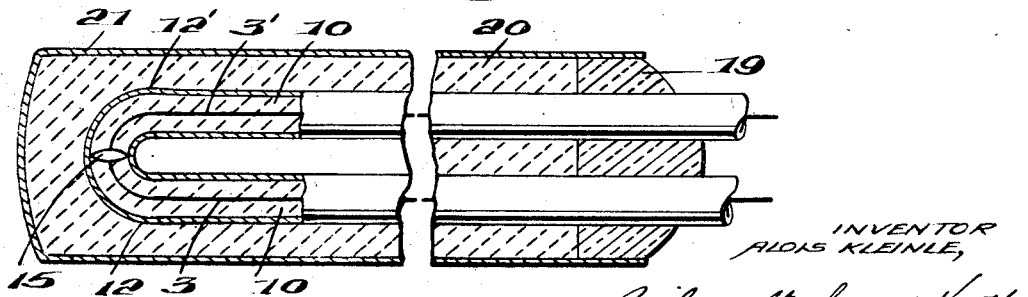
INVENTOR
ALOIS KLEINLE,
BY Bailey, Stephens & Huettig
ATTORNEYS

United States Patent Office
3,449,174
Patented June 10, 1969

3,449,174
COAXIAL JACKETTED THERMOCOUPLE
Alois Kleinle, Weinheim, Germany, assignor to Deutsche Gold- und Silber-Schiedeanstalt vormals Roessler, Frankfurt am Main, Germany
Filed Mar. 24, 1966, Ser. No. 537,073
Claims priority, application Germany, Mar. 25, 1965, D 46,891
Int. Cl. H01v 1/02
U.S. Cl. 136—228                              3 Claims

ABSTRACT OF THE DISCLOSURE

High temperature thermoelement of two coaxial conductors provided with ceramic insulation between the inner conductors and jacket.

---

The present invention relates to improved jacketted thermocouples which have a reduced tendency for giving erroneous readings at high temperatures because of increased conductivity of the insulation employed.

Noble and base metal thermocouples to an increasing extent are being produced in the form of jacketted thermocouples which have the advantage of having a small cross-section and therefore improved flexibility, as well as short response periods and good mechanical strength. Jacketted thermocouples of PtRh-Pt with a PtRh jacket can be used at temperatures up to a maximum of 1500° C. Thermocouples having two PtRh legs, for example, a thermocouple consisting of a Pt 30% Rh wire and a Pt 6% Rh wire, are used when temperatures up to about 1800° C. are concerned. For measurement of higher temperatures thermocouples of tungsten and rhenium or their alloys or of alloys of iridium and rhenium come into consideration. These thermocouple materials also can be used in the production of jacketted thermocouples in which case at least with Pt 30 Rh-Pt 6 Rh no greater difficulties are encountered in the production of jacketted thermocouples than with a Pt-Pt Rh 10 jacketted thermocouple. However, errors occur with thermocouples used at temperatures above 1500° C. because of the high electric conductivity of the ceramic insulation used for embedding the thermocouple wires which occurs at such high temperatures. The resistance of $Al_2O_3$ insulation between the two thermocouple wires of a jacketted thermocouple having a 1.5 mm. outer diameter can sink to values below 50 $\Omega$m. at 1500° C. and to values below 10 $\Omega$m. at 1700° C. The average resistance of the thermocouple wires of a diameter of about 0.3 mm. of a Pt 30 Rh-Pt 6 Rh thermocouple in the temperature range of 1500–1700° C. is about 20 $\Omega$/m. and therefore is of the same order as shunt resistance formed by the conductivity of the ceramic at such temperatures. In view of such shunt, even with compensatory measurement of thermoelectric EMF, current flow occurs within the thermocouple and a drop in potential occurs along the thermocouple wires which lie within the conductive region of the ceramic insulation. In addition, the jacket, the thermoelectric properties of which differ from those of one or both of the thermocouple wires, at very high temperatures represents a third thermocouple leg which is connected in parallel to both thermocouple wires over the conducting insulating ceramic. Such jacket therefore can provide an additional influence of the thermoelectric EMF of the thermocouple.

The errors which occur because of the conductivity of the ceramic insulation at high temperatures naturally should not be greater than the tolerance permitted. In thermocouples of noble metals such tolerance is 0.5% of the temperature to be measured.

It can be shown that the error occurring in measuring a temperature of about 1700° C. with a jacketted thermocouple having an outside diameter of 1.5 mm. can be over 5 times greater than the tolerance permitted. The error is approximately proportional to the square of the length of the portion of the thermocouple, subjected to a temperature gradient, which is at the temperature at which conductivity is engendered in the insulating ceramic. Such error occurs right from the start and does not represent an aging phenomenon. As it is very greatly dependent upon the length of the thermocouple subjected to the high temperature and upon the temperature gradient, it is not possible to take such error into account during calibration of the thermocouple.

It is hardly possible to decrease the error caused by the conductivity of the ceramic insulation at high temperatures by increasing the resistance of the insulation as all insulators become good conductors at very high temperatures. The line resistance can to a certain extent be lowered by the use of thicker wires and therefore thicker jacketted thermocouples. This, however, causes the normal advantages of jacketted thermocouples to be lost. Nevertheless, it is not possible to reduce the error to the tolerance permitted when temperatures over 1700° C. are concerned or when lower temperatures concerned with small temperature gradients (long length subjected to temperature measured) in this manner if practical dimensions are to be employed.

Contamination of one or both thermocouple wires can occur during use at high or very high temperatures in that alloy components may vaporized from the jacket or from the other thermocouple leg. The resulting vapors can diffuse through the ceramic insulation and alloy with the other or both legs of the thermocouple. The resulting change in composition of the thermocouple wire in the course of time can lead to substantial change in the thermoelectric EMF (aging).

The objects of the present invention are to reduce the errors occurring in jacketted thermocouples (of any desired thermocouple combination) because of conductivity of the insulating ceramic at temperatures above 1500° C. substantially and also to prevent the aging effect described above completely.

These objects are achieved according to the invention by constructing each individual leg of the thermocouple as a coaxial conductor with ceramic insulation between the inner conductor and the jacket, and by having the jacket have the same thermoelectric characteristics as those of the inner conductor associated therewith over the entire range of temperatures which are contemplated to be measured by having the ends of the inner conductors of both coaxial conductors at one end thereof joined together to form the hot junction of the active measuring thermocouple and by providing an electrical connection between the ends of both jackets adjacent to the hot junction but having the remaining portion of such jackets electrically insulated from each other.

The accompanying drawings illustrate several embodiments of jacketted thermocouples according to the invention.

In such drawing:

FIG. 1, shows a cross-section of one embodiment of a jacketted thermocouple according to the invention;

FIGS. 2–3 show a plan view partialy in sction of several other embodiments of jacketted thermocouples according to the invention; and FIG. 4 shows a cross-section of still another form of jacketted thermocouple according to the invention.

The jacketted thermocouples according to the invention as can be seen from the drawings, do not as previously customary merely consist of two wires forming the legs of the thermocouples insulated from each other and from a common jacket by ceramic material but rather have the wires forming each leg of the thermocouple provided with an individual jacket of the same composition or substantially the same composition as the wire with which it is associated, such wires being insulated from the jackets and such jackets being insulated from each other except at the ends adjacent the hot junction between the wires of the thermocouple.

In the embodiment of the jacketted thermocouple according to the invention shown in FIG. 1, the thermocouple consists of two coaxial conductors whose outer diameter expediently is not greater than 1.0 to 1.5 mm. The jackets 2 and 2' and the inner conductors 3 and 3' each of the two coaxial conductors are of the same alloy. The inner conductors are embedded in a usual insulating ceramic such as sintered $Al_2O_3$ to insulate them from the jacket associated therewith. The two inner conductors 3 and 3' consisting of different aloys A and B, for example, Pt 30 Rh and Pt 6 Rh are welded together at one end to form hot junction 4 and form the actual measuring thermocouple. The adjacent ends of jackets 2 and 2' are welded together at 5. Both other free ends of the inner conductors serve as cold junctions or can be lengthened by normal compensating conductors. The ends of the jackets 2 and 2' which also consist of alloys A and B respectively are joined electrically at 5, for example, by welding at the ends adjacent to the hot junction 4. The jackets then form a second thermoscouple which is electrically connected in parallel to the thermocouple and has the same thermoelectric characteristics. The measuring thermocouple formed by the iner conductors is therefore surrounded by a shielding thermocouple. Even though each jacket must consist of the same alloy or metal as the thermocouple wire which it encases, it is possible to use a material of lower purity for the jacket. In the ideal instance, therefore with very good insulation between both coaxial condutors, the course of the electric potential in the jacket and in the thermocouple wire associated therewith is the same so that even with poor insulating capacity of the ceramic insulation within the coaxial conductors, no thermoelectric curent flows within the thermocouple element. In the normal instance, that is, when a shunt exists between both jackets a slight potential diference $\Delta U$ occurs between the jacket and the thermocouple wire. This difference in potential, however, is more than one order of magntude smaller than the thermoelectric potential $\Delta E$ between both legs of an ordinary jacketted thermocouple caused by failure of the insulation. The insulation failure with the conventional jacketted element is proportional to $\Delta E$, however, with the element according to the invention it is proportional of $\Delta U$. The error in thermoelectric potential caused by conductivity of the ceramic insulation is reduced by more than one order of magnitude by the construction employed for the thermocouples according to the invention. (The proportionality factor with $\Delta E$ or respectively $\Delta U$ in addition is smaller in the new constructions according to the invention than in the conventional thermocouples.) Fundamentally, insulation is only necessary between both coaxial conductors in the portion of the thermocouples which is subjected to such higher temperatures that a noteworthy conductivity exists in the ceramic insulation, that is, temperatures above about 1300–1400° C. In some instances a sufficient insulation between both casings can be achieved by having both legs spaced from each other at least until they leave the hot zone. In general, however, it is advantageous to cover the casing with an insulating coating, such as a coating of $Al_2O_3$ applied by flame spraying. A further possibility is to separate both legs from each other by insulating beads or tubes, eventually only in the region subjected to temperatures over 1300° C. The insulating method most suited depends upon the conditions of the use contemplated.

The embodiment shown in FIG. 2 is similar to that of FIG. 1 except that in this instance the hot junction 4 of the inner conductors 3 and 3' is within the inner space provided by welding together the ends of jackets 12 and 12' to provide the closed welded joint 15.

In the embodiment shown in FIG. 3, both jacketted legs 32 and 32' of the thermocouples are kept separated from each other with the aid of insulating tubes of sintered $Al_2O_3$ which are slipped over each leg. In this instance also the hot junction 4 is protected by a metal cap 9 preferably of the same alloy as one of the jackets containing ceramic insulation 10'.

If desired, the thermocouples according to the invention formed of coaxial conductors can be protected by a common protective tube or jacket. Such an embodiment is illustrated in FIG. 4 which includes the same basic thermocouple shown in FIG. 2 which in this instance, however, is embedded in ceramic insulation 20 which is surrounded by a common jacket 21 of a metal with high melting point, for example Pt 30 Rh, Pt 10 Rh or Pt 6 Rh so that its outer construction resembles that of a conventional jacketted thermocouple but that both legs of the thermocouple consist of coaxial conductors about 1.0 to 1.5 mm. in diameter rather than solid conductors. The resulting doubly jacketted thermocouple is especially well protected against external influences. The outer diameter of such doubly jacketted thermocouple preferably should not exceed about 6 mm. The cool outer end of the doubly jacketted thermocouple can be sealed with a fused ceramic mass such as shown at 19 in FIG. 5. The addition protective tube or jacket need only be provided over the portion of the thermocouple subjected to high temperatures of, for example, above 1300° C.

As each thermocouple wire and the jacket associated therewith consists of the identical metal or alloy, it is not possible for the thermocouple wire to be contaminated by different materials derived from the jacket. The thermocouples according to the invention therefore provide for better consistency of measurements over periods of time than with conventional jacketted thermocouples.

I claim:
1. A thermoelectric element for use at high temperature comprising two coaxial conductors, each including an outer electrically conductive jacket and inner conductor with ceramic insulation between said inner conductors and the jackets, the inner conductor and jacket of each of such coaxial conductors having the same thermoelectric characteristic over the entire temperature range in which the thermoelectric element is to be used, said inner conductors of said coaxial conductors being joined together electrically to form a hot junction of the measuring thermocouple formed by such joined inner conductors, said jackets also being electrically connected together only at their ends adjacent to the hot junction and insulated electrically and from the inner conductors.

2. The thermoelement of claim 1 in which the inner conductor and the jacket of each coaxial conductor taken individually is composed of the material of the same composition.

3. The thermoelement of claim 2 in which the exterior of the jackets of each coaxial conductor is coated with an insulating coating of an oxidic material.

References Cited

UNITED STATES PATENTS

| | | |
|---|---|---|
| 2,368,937 | 2/1945 | McGillin et al. ---- 136—233 X |
| 2,802,894 | 8/1957 | Schneider ---------- 136—232 |
| 2,987,565 | 6/1961 | Barnhart et al. ------ 136—233 |
| 3,278,341 | 10/1966 | Gee ---------------- 136—233 |

FOREIGN PATENTS

| | | |
|---|---|---|
| 555,052 | 6/1923 | France. |
| 854,570 | 11/1960 | Great Britain. |

ALLEN B. CURTIS, *Primary Examiner.*

U.S. Cl. X.R.

136—230